United States Patent [19]
Reardon et al.

[11] Patent Number: 4,929,364
[45] Date of Patent: May 29, 1990

[54] AMINE/GALLIC ACID BLENDS AS OXYGEN SCAVENGERS

[75] Inventors: Patricia A. Reardon, Downers Grove; David A. Grattan, La Grange Highlands, both of Ill.

[73] Assignee: Nalco Chemical Company, Naperville, Ill.

[21] Appl. No.: 268,661

[22] Filed: Nov. 4, 1988

Related U.S. Application Data

[63] Continuation of Ser. No. 64,161, Jun. 19, 1987, abandoned.

[51] Int. Cl.$^5$ ................................................ C02F 1/20
[52] U.S. Cl. ................................... 210/750; 210/757; 252/178; 252/188.28; 252/393; 252/404
[58] Field of Search .................. 210/750, 757; 422/16, 422/17; 252/393, 404, 188.28, 178

[56] References Cited

U.S. PATENT DOCUMENTS

| | | | |
|---|---|---|---|
| 3,425,954 | 2/1969 | Ruzevick | 422/17 |
| 3,696,044 | 10/1972 | Rutledge | 422/17 |
| 3,966,632 | 6/1976 | Colliopoulos | 252/309 |
| 4,219,433 | 8/1980 | Manabe | 422/17 |
| 4,234,440 | 11/1980 | Hirozawa | 422/17 |
| 4,240,925 | 12/1980 | Tait | 252/389 A |
| 4,269,717 | 5/1981 | Slovinsky | 210/750 |
| 4,278,635 | 7/1981 | Kerst | 422/14 |
| 4,289,645 | 9/1981 | Muccitelli | 252/188.28 |
| 4,311,599 | 1/1982 | Slovinsky | 210/757 |
| 4,324,675 | 4/1982 | Barthold | 422/17 |
| 4,356,301 | 10/1982 | Gleim | 528/487 |
| 4,389,371 | 7/1983 | Wilson | 422/17 |
| 4,414,350 | 11/1983 | Hall | 524/320 |
| 4,419,327 | 12/1983 | Kelly et al. | 422/17 |
| 4,443,340 | 4/1984 | May | 422/17 |
| 4,487,708 | 12/1984 | Muccitelli | 252/188.28 |
| 4,549,968 | 10/1985 | Muccitelli | 252/188.28 |
| 4,626,411 | 12/1986 | Nemes | 210/750 |

FOREIGN PATENT DOCUMENTS 2138796 10/1984 United Kingdom ........... 252/188.28

OTHER PUBLICATIONS

Rosenberg, S. P., "The Inhibition of Aqueous Corrosion of Iron by Gallic Acid" presented at the Australian Corrosion Association Conference held at Adelaide on Nov. 17–21, 1986.

*Primary Examiner*—Ernest G. Therkorn
*Attorney, Agent, or Firm*—Anthony L. Cupoli; Donald G. Epple

[57] ABSTRACT

An aqueous concentrate useful for treating boiler waters to scavenge oxygen therefrom which contains at least 0.3% by weight of either gallic acid or propyl gallate. This aqueous concentrate has a pH adjusted to at least 8.5 by a water-soluble neutralizing amine of the type used to treat boiler waters. Additionally, a method for treating boiler waters with an oxygen scavenger.

4 Claims, No Drawings

AMINE/GALLIC ACID BLENDS AS OXYGEN SCAVENGERS

This is a continuation of application Serial No. 064,161 filed on 6-19-87, now abandoned.

DEFINITIONS

The term "gallic acid" includes the salts of gallic acid. The term "percent" (%) is percent by weight.

INTRODUCTION

The presence of trace levels of dissolved oxygen is one of the major causes of boiler system corrosion. In addition, if the boiler water pH is allowed to become acidic, corrosion is accelerated.

In most systems, the levels of dissolved oxygen can be reduced to less than 10 parts per billion with mechanical deaeration. Even this small amount of oxygen is corrosive at boiler system temperatures and pressures.

Removal of the last traces of oxygen is accomplished by treating the water with an oxygen scavenger. Hydrazine and sulfite are widely used for this purpose, but they have some shortcomings.

Sodium sulfite, although an effective scavenger, is not recommended for use in systems operating above 1,000 psi because breakdown occurs to form corrosive hydrogen sulfide and sulfur dioxide. Also, sodium sulfite increases the amount of dissolved solids, as well as the conductivity, in the boiler water.

Hydrazine is not as active as sulfite in its reaction with oxygen but the products of the reaction are all volatile. Unfortunately, hydrazine is a listed carcinogen and must be handled with care in all applications.

It would be advantageous to provide an oxygen scavenger that is not carcinogenic.

PROPYL GALLATE AND GALLIC ACID

Propyl gallate and gallic acid have been found to effectively scavenge oxygen. At 185° F., a dosage of 1 mole of propyl gallate per mole of oxygen removed 87% of the oxygen originally present after 5 minutes. At the same conditions, a dosage of 1 mole of gallic acid per mole of dissolved oxygen resulted in 95% removal of the oxygen present after 5 minutes.

The test method used oxygen saturated water fed through a flow-through pre-boiler simulator. The residence time of the treatment chemical was approximately 5 minutes. The water temperature was maintained at 185° F. and the pH controlled with sodium hydroxide. Oxygen levels were continuously monitored using an oxygen specific electrode.

One drawback of these two compounds, as named, is their low solubility in water. Propyl gallate is the least soluble of the two with a solubility of 0.35 gram per 100 ml of water. Such low solubility does not allow for the high concentrations needed in products used in boiler applications.

THE INVENTION

The invention includes an improved method for scavenging dissolved oxygen from waters used to generate steam which comprises treating said waters with either gallic acid or propyl gallate at a dosage of at least 0.3 mole per mole of oxygen, preferably 1-2 moles per mole of oxygen, contained in said waters.

The invention also includes aqueous concentrates useful for treating boiler waters to scavenge oxygen therefrom which contains at least 0.3 weight percent propyl gallate or gallic acid up to their saturation solubility. These aqueous concentrates include a water-soluble neutralizing amine of the type used to treat boiler waters to prevent corrosion. The amine enhances the solubility of the gallates. Because boiler waters to be treated generally have a pH of at least 8.5, it is preferred, that the concentrate have a pH of at least 8.5.

CONDITIONS OF USE AND DOSAGE

These scavengers, i.e. propyl gallate and gallic acid, are active at room temperature; and, will be effective as an oxygen scavenger in boiler water systems which utilize pressures ranging from 5 to 3000 psig. Preferably, the scavengers will be fed either to the pre-boiler system or the condensate return system.

As indicated, the oxygen scavengers used in the practice of the invention are capable of scavenging at dosages as low as 0.3 mole per one mole of oxygen present in the system. Best results are obtained when one mole or more per mole of oxygen present in boiler waters is used.

THE AQUEOUS CONCENTRATE

As pointed out, one of the drawbacks of using either gallic acid or propyl gallate are their poor solubility in water. Included in the invention are aqueous concentrates of these compound which are prepared by solublizing the scavengers with neutralizing amines of the type used in condensate systems. These amines are thus for purposes of this invention solublizing amines. Preferably the solublizing amine will be used in amounts sufficient to adjust the pH to at least 8.5 or greater. No advantage is obtained if the pH is adjusted greater than 11.5.

When the waters used to prepare such a concentrate have their pH's adjusted with the neutralizing amines, it is possible to dissolve in such waters between about 5–10% by weight propyl gallate or gallic acid. Such concentrates are admirably suited to treat boiler waters to scavenge oxygen.

TABLE I

Solubilization of Propyl Gallate by Condensate Amines

| Room Temperature (wt %) | % PG* | Solubility at 0 Hours | Solubility at 60 Hours | pH |
|---|---|---|---|---|
| water | 0.35 | insoluble | insoluble | 5.9 |
| NaOH (0.002%) | 0.35 | in solution | insoluble | 10.6 |
| NaOH (0.00008%) | 0.3 | in solution | in solution (slight precipitate) | 9.3 |
| Water | 0.3 | in solution | slight precipitate | 5.0 |
| Water | 0.2 | in solution | soluble | 5.0 |
| Water | 0.1 | in solution | soluble | 5.0 |
| Diethylaminoethanol (DEAE), 10% | 10 | insoluble | insoluble | **alk |
| DEAE, 10% | 7 | in solution | in solution | alk |
| DEAE, 10% | 5 | in solution | in solution | 9.8 |
| Morpholine, 10% | 5 | in solution | small amount precipitate | 9.6 |
| Cyclohexylamine 10% | 5 | insoluble | insoluble | 11.6 |
| Dimethylisopropanolamine 10% | 5 | in solution | in solution | 10.1 |
| Monoethanolamine 10% | 5 | in solution | in solution | 10.6 |
| Methoxypropylamine | — | 5 | in solution | in |

TABLE I-continued

Solubilization of Propyl
Gallate by Condensate Amines

| Room Temperature (wt %) | % PG* | Solubility at 0 Hours | Solubility at 60 Hours | pH |
|---|---|---|---|---|
| solution 10% | | | | |

*Percent PG = percent propyl gallate
**alk = alkaline

According to the Merck Index, 10th Edition, the solubility of propyl gallate in water at room temperature is 0.35 weight percent. As shown in Table I some slight precipitate of propyl gallate occurs at 0.3 wt. % at 60 hours. Thus, amine, is advantageous at any propyl gallate concentration in excess of 0.30 wt. % and most particularly in excess of 0.35 wt. % propyl gallate.

TABLE II

Solubilization of Gallic Acid by Condensate Amines

| Room Temperature (wt %) | % GA* | Solubility at 0 Hours | Solubility at 60 Hours | pH |
|---|---|---|---|---|
| Water | 5 | insoluble | — | — |
| NaOH, 0.002% | 5 | in solution | in solution | — |
| DEAE, 10% | 5 | in solution | in solution | — |
| Morpholine, 10% | 5 | in solution | in solution | — |
| Cyclohexylamine, 10% | 5 | in solution | insoluble | — |

*Percent GA = percent gallic acid

According to the Merck Index, 10th Edition, the solubility of Gallic acid in water is 1.15 weight percent. Thus, amine is particularly advantageous in solubilizing greater than 1.15 wt % of gallic acid.

As shown in the Tables the amines generally used in boiler waters are particularly advantageous in solubilizing gallic acid and propyl gallate. Cyclohexylamine appears to be an amomaly for both propyl gallate and gallic acid. The concentration of amine and the efficacy of any particular amine can be quickly determined using known techniques.

We claim:

1. A method for scavenging dissolved oxygen from waters used to generate steam which comprises treating said waters with at least 0.5 mole of propyl gallate per mole of oxygen contained in said boiler water using an aqueous concentrate containing at least 0.3 weight percent propyl gallate, said aqueous concentrate having a pH of at least 8.5, said pH having been adjusted by a water-soluble neutralizing amine of the type used to treat boiler waters said neutralizing amine being present in sufficient amount to solubilize said propyl gallate in said waters used to generate steam.

2. The method of claim 1, wherein at least 1 mole of propyl gallate per mole of oxygen is used.

3. A method for scavenging dissolved oxygen from water used to generate steam which comprises treating said waters with at least 0.3 mole of gallic acid per mole of oxygen contained in said boiler water using an aqueous gallic acid concentrate containing at least 1.15 weight percent gallic acid, said aqueous concentrate having a pH of at least 8.5, said pH having been adjusted by a water-soluble neutralizing amine of the type used to treat boiler waters, said neutralizing amine being present in sufficient amount to solubilize said gallic acid in said waters used to generate steam.

4. The method of claim 3, wherein at least 1 mole of gallic acid per mole of oxygen is used.

* * * * *